Feb. 25, 1936.    R. BECK    2,032,041
DIFFERENTIAL CONTROL APPARATUS
Filed Oct. 11, 1933    3 Sheets-Sheet 2
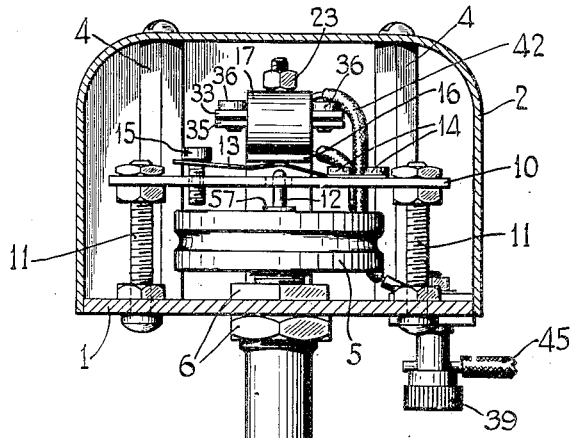
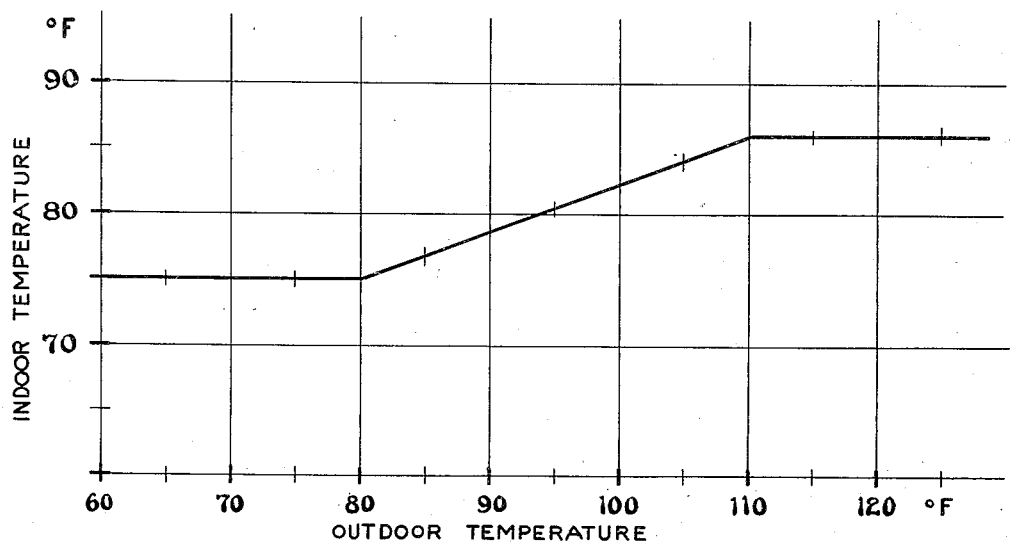
INVENTOR
RUDOLF BECK
BY
Darby & Darby
ATTORNEYS Feb. 25, 1936.    R. BECK    2,032,041

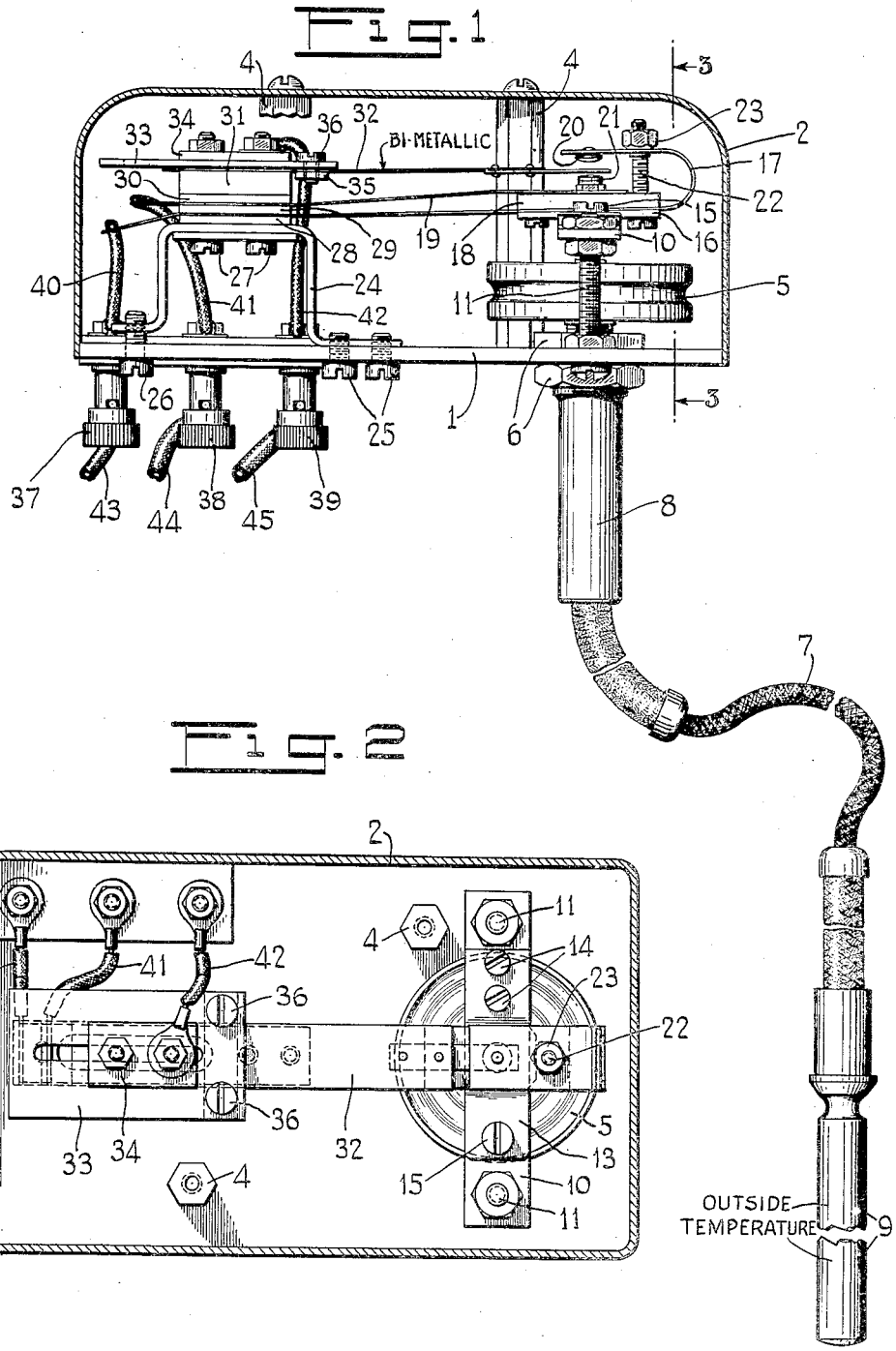

DIFFERENTIAL CONTROL APPARATUS

Filed Oct. 11, 1933    3 Sheets-Sheet 3

INVENTOR
RUDOLF BECK
BY
Darby & Darby
ATTORNEYS

Patented Feb. 25, 1936

2,032,041

UNITED STATES PATENT OFFICE 2,032,041

DIFFERENTIAL CONTROL APPARATUS

Rudolf Beck, Bridgeport, Conn., assignor to Consolidated Ashcroft Hancock Company, Inc., Bridgeport, Conn., a corporation of Delaware Application October 11, 1933, Serial No. 693,059

9 Claims. (Cl. 200—140)

This invention relates to a device for controlling the temperature or humidity of a room or other enclosed space responsive to conditions of temperature or humidity both within the space and on the outside.

In connection with the control of the temperature of an enclosed space such as a theatre, restaurant, house, railroad car, etc., it has been found that if the temperature of the interior is too low with respect to the temperature of the exterior, discomfort is caused to persons who enter such enclosed space after having been on the outside. For example, if the outside temperature is 100 degrees, it is uncomfortable to enter a room in which the temperature is lower than approximately 81 to 83 degrees. The comfort range of inside temperature for outside temperatures ranging approximately from 80 to 110 degrees has been found to vary from approximately 75 to 85 degrees, in direct ratio to the outside temperature. When the outside temperature falls below approximately 80 degrees, however, it has been found that it is comfortable to enter a room, the temperature of which is maintained constant at approximately 75 degrees, even though the outside temperature may fall greatly below 80 degrees. Similarly, if the outside temperature rises to 110 degrees, or higher, it has been found comfortable to enter a room in which the temperature is maintained approximately constant around 84 to 86 degrees, no matter how high the outside temperature may go. In order to control the temperature of a room at a point that will be comfortable both for those entering the room from the outside, as well as for those who remain inside for a considerable time, it is therefore necessary to regulate the inside temperature in accordance with the outside temperature between ranges of outside temperature of approximately 80 to 110 degrees, and outside of this range to keep the inside temperature substantially constant.

An object of this invention is to provide a simple device which will control the inside temperature differentially with respect to the outside temperature in accordance with the foregoing considerations.

In the winter it is of course necessary to heat a house or other enclosed space to approximately a constant temperature for comfort. Warm air usually contains more humidity than cold air. If the temperature of the exterior of an enclosed space falls too far below that of the interior, it therefore frequently occurs that there is a condensation of frost on the inside of the windows. Also, in a house which is not properly insulated there will be a condensation on the walls which may take place under the wall paper and tend to loosen it, thereby causing considerable damage. This condensation on the interior may be obviated by reducing the humidity of the interior. As the temperature of the exterior continues to fall, it will be necessary to have a lower and lower degree of humidity on the interior in order to prevent such condensation.

Another object of this invention is to provide a device which will control the humidity of the interior of an enclosed space in accordance with the outside temperature.

A feature of the invention is the provision of an expansible member which is controlled by outside temperature, and which is operable over a portion only of the outside temperature range to exercise a differential controlling effect on cooling or humidifying apparatus.

In the drawings similar reference numerals refer to similar parts in all of the figures.

Figure 1 is a side elevation, partly in section, and partly broken away, of a device of the invention;

Figure 2 is a plan view, partly in section, of a device of Fig. 1;

Figure 3 is a cross section of the device along the line 3—3 of Figure 1, looking in the direction of the arrows;

Figure 4 is a modification of the bi-metallic element shown in Fig. 1, which may be used for controlling humidity;

Figure 5 is a temperature chart indicating the comfort range of indoor temperature with respect to outdoor temperature.

Figure 6:
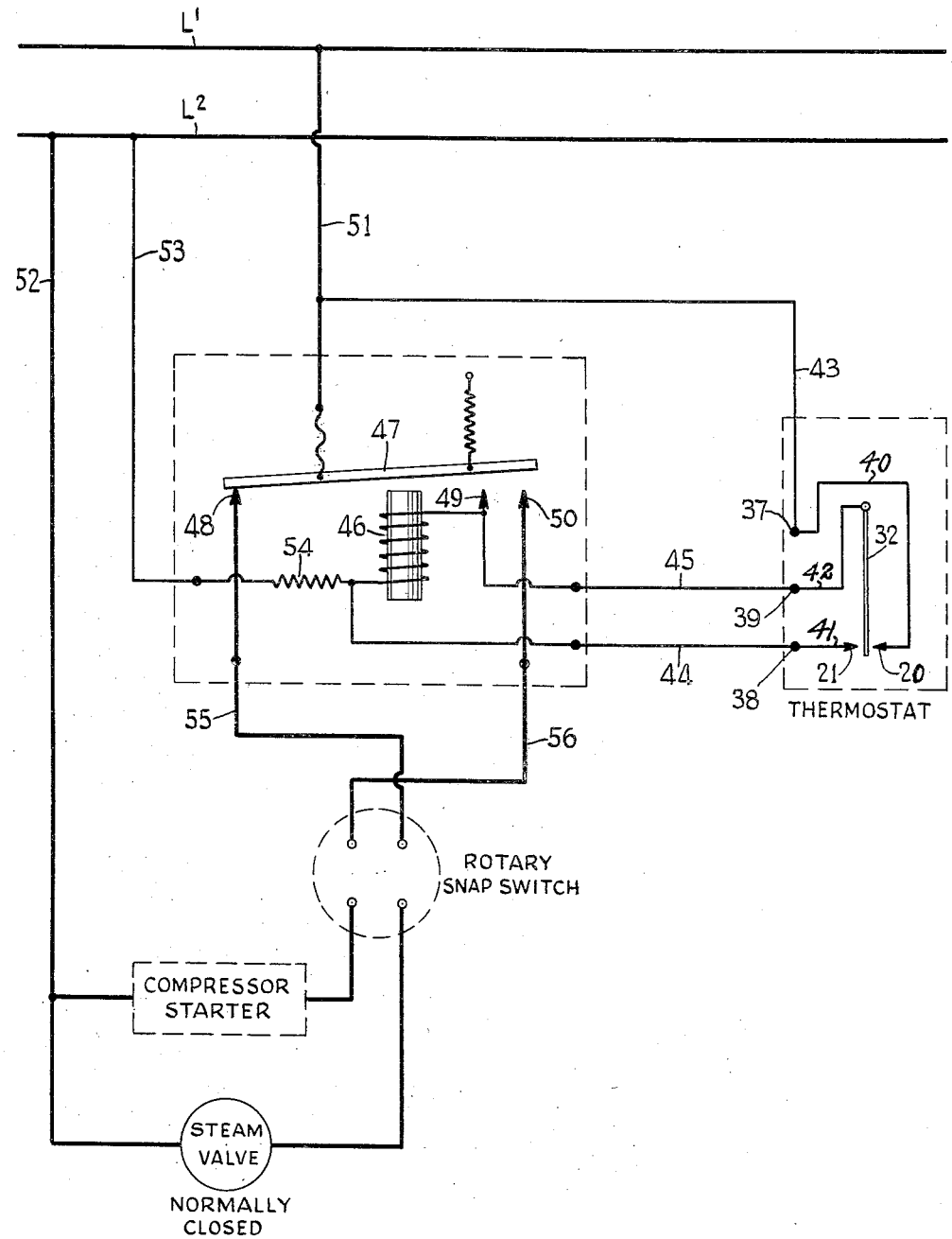
Figure 6 is a circuit diagram showing electrical circuits and apparatus for controlling heating, cooling or dehumidifying apparatus by means of the device of the invention.

A plate 1 has a cover 2 secured thereto in any suitable manner as indicated at 4. A bellows 5 is rigidly secured to the base 1 by means of nuts 6 and is connected with a capillary tube enclosed within a sheath 7. A casing 8 is provided to enclose the sheath 7 in proximity to the plate 1 for rigidity. A capsule 9 is connected to the capillary tube on the other end, and is adapted to be hung out the window or in any other suitable way exposed to the outside temperature. The capillary tube, capsule 9 and bellows 5 are supplied with any suitable volatile material, such as ether, which changes its vapor pressure with changes in temperature. A rigid cross piece 10 is secured to the plate 1 by means of screw headed bolts 11 and nut, as shown. The height of this cross piece from the plate 1 may be adjusted by adjusting the nuts on bolts 11. The bellows 5 has secured to its center a stud 12 having a shoulder 57, as best shown in Figure 3, which will of course be raised and lowered as the bellows expands and contracts. The cross piece 10 has an aperture in its center through which the stud 12 may project, but which is smaller than the shoulder 57. A spring 13 is secured to the cross piece 10 by means of two bolts 14, and may be adjusted with respect thereto by means of a third bolt 15. This spring 13 likewise has an aperture in its center through which the stud 12 may pass. The stud 12 engages a piece of insulation 16 secured to the bottom of a U-shaped contact strip 17. A second piece of insulation 18 is secured to the contact strip 17 and separates a second contact strip 19 therefrom.

Contact strip 17 is provided with a contact 20 and contact strip 19 is provided with a contact 21. The space between these contacts may be adjusted by means of a screw headed bolt 22 and nut 23. At the opposite end of the plate 1 from the bellows there is mounted a supporting member 24 which is secured to the plate 1 at one end by means of bolts 25 and at the other end by means of a bolt 26. This supporting member is just flexible enough to permit swinging around bolts 25 through a small angle by means of the bolt 26. Secured to the supporting member 24, by means of bolts 27 and the nuts associated therewith, are an insulating piece 28, the contact strip 17, an insulating piece 29, the contact strip 19, an insulating piece 30, a block 31 which may be of insulating material or may be metallic, a bi-metallic strip 32, a metallic plate 33 and a metallic cover plate 34. The plate 33 has a longitudinal slot therein as shown in Fig. 2, and the bi-metallic strip 32 is rigidly secured to the plate 33 by means of a metallic strip 35 and bolts 36. The range of movement of the bi-metallic strip 32 is proportional to the square of its effective (free) length. Its effective length is measured from the point at which it is secured rigidly to the plate 33, that is at the edge of this plate toward the contact points 20 and 21.

In order to adjust the effective length of the bi-metallic strip, therefore, for the desired degree of movement the nuts 36 and the nuts associated with bolts 27 may be loosened and the plate 33 moved toward or away from the contact points 20 and 21 and the nuts tightened in the new position. Three binding posts 37, 38 and 39 make contact respectively through leads 40, 41 and 42 with the contact strip 17, the contact strip 19 and the bi-metallic strip 32. These binding posts are connected respectively by wires 43, 44 and 45 to the electrical circuits shown in Fig. 6.

Fig. 6 shows an electrical circuit for operating a compressor starter from one contact on a relay armature and a steam valve from another contact on the armature. A rotary snap switch is shown which may be operated manually twice a year, in the spring to connect the compressor starter in the line with its contact, and in the fall to connect the steam valve in the line with its contact. A source of current of any desired value is supplied by a line L—1, L—2. A relay 46 has an armature 47 adapted to complete electrical circuits through contacts 48, 49 and 50. The armature is normally biased to close contact 48. One side of the line L—1 is connected to armature 47 by means of a wire 51. It is also connected to the binding post 37 of the device shown in Figs. 1, 2 and 3 by means of wire 43. The other side of the line L—2 is connected by a wire 52 to one side of the compressor starter, and to one side of the steam valve. The compressor starter and the steam valve are normally not in operation. The line L—2 is also connected, by means of a wire 53, to a limiting resistance 54. The other side of the resistance 54 is connected by line 44 to the binding post 38 of the device shown in Figs. 1, 2 and 3. It is also connected through the winding of the relay 46 to contact 49 and to binding post 39.

Contact 48 is connected by a wire 55 through the rotary snap switch to the device for operating the steam valve. Contact 50 is connected by wire 56 through the rotary snap switch to the device for operating the compressor starter.

Assume that the rotary snap switch in Fig. 6 is in the position to connect the compressor starter in the circuit when that circuit is closed by contact 50, and assume that the contact 48 is closed and the bi-metallic strip 32 is midway between contacts 20 and 21 as shown in Fig. 6. As the temperature of the room rises, bi-metallic strip 32 will move toward contact 20 and will eventually close that contact. This will complete a circuit from line L—1 through leads 51, 43, and 40 to the bi-metallic strip 32, through leads 42, 45, and 53 through the winding of relay 46, and will operate that relay. Contact 48 will be broken. This contact does not, however, at this time control any operation as the rotary snap switch is in the position to permit the apparatus to control the compressor starter. Contacts 49 and 50 will be made. Contact 49 is a holding contact and will complete a circuit from line L—1 through lead 51, armature 47, contact 49, winding of relay 46, limiting resistance 54, and lead 53, back to line L—2. This will hold the relay 46 in operated position and retain contacts 49 and 50 closed after contact 20 has been broken. This reduces the current flowing through contact 20 and prevents arcing.

A circuit will be completed from line L—1 through lead 51, armature 47, contact 50, lead 56 and lead 52, back to line L—2. This circuit will include the device for operating the compressor starter which will operate to reduce the temperature in the room. As the temperature in the room decreases bi-metallic strip 32 will move away from contact 20, but the compressor will continue to operate as contact 49 retains the circuit through contact 50 and through the compressor starter. When the temperature in the room has fallen to the point where metallic strip 32 makes contact with contact 21, a circuit will be completed from line L—1 through lead 51, armature 47, contact 49, leads 45 and 42, bi-metallic strip 32, contact 21, leads 41 and 44 to the other side of the winding of relay 46, and through limiting resistance 54 and lead 53 to line L—2. This will short circuit the relay winding 46 and the relay will release its armature. The line L—1, L—2 will not however be short circuited because of the resistance 54. Contact 48 will now be closed, but, as before stated, this will have no effect as the rotary snap switch is in the position to connect the compressor starter. Contact 50 will be broken and the compressor will return to non-operating condition. This cycle of operations will of course be repeated with the repeated operation of the bi-metallic strip 32 between contacts 20 and 21.

In the winter when the rotary snap switch is thrown to the right to connect the device for operating the steam valve in the line 55, the contact 48 will, of course, be operative to open and shut the steam valve, and the contact 50 will perform no function. The contact 49 will however operate as before as a holding contact to hold the relay 46 operated from the time contact 20 is closed until the time contact 21 is closed. The circuit arrangement to keep the apparatus for heating or cooling the room in operation until the opposite contact is made by the bi-metallic strip is provided in order to prevent too frequent operation of the compressor starter, or of the steam valve.

The distance between contact points 20 and 21 and the effective length of bi-metallic strip 32 may be adjusted in the manner previously described, for a desired range of temperature, say approximately 2 degrees, between the closing of contact 20 and the closing of contact 21.

A number of adjustments are provided for the thermostat shown in Figs. 1, 2 and 3. These adjustments will normally be made at the factory to meet the desired operating conditions, but may, of course, be made at the time and place of installation. In adjusting the device for operation the capsule 9 may first be exposed to the maximum temperature at which it is desired to have the differential control effective. This will normally be, as shown in Fig. 5, approximately 110 degrees. The bolts 11 will then be adjusted until shoulder 57 at the base of stud 12 rests against the cross piece 10. The cross piece 10 will then prevent any further expansion of the bellows 5 from raising the contact strip 17 any higher, even though the outside temperature should rise above 110 degrees. The capsule 9 will then be exposed to the minimum temperature at which it is desired to have the device exercise a differential controlling effect. This will normally be at approximately 80 degrees, as shown in Fig. 5. The spring 13 will then be adjusted by means of bolt 15, until it rests against insulating piece 16, to prevent further downward movement of contact strip 17, even though the bellows continues to contract, and removes stud 12 from contact with insulating piece 16. The contact strip 17 is normally biased so that insulating piece 16 rests on spring 13 and is raised therefrom only by the stud 12 on expansion of the bellows. The distance between contacts 20 and 21 and the effective length of bi-metallic strip 32 may be adjusted as previously described to control the temperature range between the operation and non-operation of the heating or cooling means.

The position of the bi-metallic strip 32 with respect to contacts 20 and 21 may be adjusted by adjusting bolt 26. As contact strip 17 is biased towards spring 13, this will not change its position with respect to spring 13, but will change the position of bi-metallic strip 32 with respect to contacts 20 and 21. The device will now be adjusted to operate the compressor starter of Fig. 6 in accordance with the comfort range of inside temperature indicated in Fig. 5. In the winter the outside temperature will, of course, never be high enough to expand bellows 5 sufficiently to cause stud 12 to engage insulating piece 16. The device will therefore also be adjusted for constant temperature control in the winter. The only control required of the user will be twice a year to snap the rotary snap switch of Fig. 6.

It will be noted that in spite of these various adjustments the assembly is very compact and rigid, and may be operated satisfactorily under considerable vibration, such as would occur on a railroad car in motion. In this case the capsule 9 could be secured in position beneath the car, and the general assembly would, of course, be inside the car.

In Fig. 4 is shown a strip composed of metal and wood, which may be substituted in the device of Figs. 1, 2 and 3, and in the circuit of Fig. 6, for the bi-metallic strip 32. Such a device responds to humidity variations in the same manner a bi-metallic strip responds to temperature variations. It will operate to control the humidity of a room or other enclosed space in accordance with the temperature of the outside. As heretofore explained, it is desirable to reduce the humidity of a room as the outside temperature decreases. The operating range of the device within which the differential control is effective may be adjusted similarly to its adjustment for temperature control as described above. The adjustment will, of course, depend upon whether contact 20 or 21 is closed for increased or decreased humidity in the room, and this, in turn, will depend upon whether the metallic part of the strip, or the wooden part of the strip is uppermost. The circuit connections to the contacts, and the question of whether the dehumidifying device (which would be substituted for the cooling or heating device of Fig. 6) is normally operating or normally not operating, will also of course depend on the arrangement of apparatus.

While I have described a specific embodiment of my device, it is to be understood that I do not limit myself thereto, except as indicated in the appended claims.

What is claimed is:

1. A stud, two pairs of contacts in alignment with said stud, means responsive to atmospheric conditions for alternatively making contact between two of said contacts, temperature responsive means for actuating said stud to cause it to vary the position of one pair of said pairs of contacts, and means limiting the movement of said stud in one direction and limiting the movement of said one pair of contacts in the opposite direction.

2. A stud, two pairs of contacts in alignment with said stud, means responsive to temperature variations for alternatively making contact between two of said contacts, temperature responsive means for actuating said stud to cause it to vary the position of one pair of said pairs of contacts, and means limiting the movement of said stud in one direction and limiting the movement of said one pair of contacts in the opposite direction.

3. A stud, two pairs of contacts in alignment with said stud, means responsive to humidity variations for alternatively making contact between two of said contacts, temperature responsive means for actuating said stud to cause it to vary the position of one pair of said pairs of contacts, and means limiting the movement of said stud in one direction and limiting the movement of said one pair of contacts in the opposite direction.

4. A contact arm carrying a pair of contacts insulated from one another, a bi-metallic strip having a pair of contacts adapted to engage the contacts on said arm, a stud for engaging said arm, a shoulder on said stud, a cross-piece beneath said arm to limit its movement in one direction, said cross-piece having an aperture to permit the passage of said stud and to engage said shoulder to limit the movement of the arm in the opposite direction, and means responsive to temperature variations for actuating said stud.

5. A contact arm carrying a pair of contacts insulated from one another, a strip responsive to humidity variations having a pair of contacts adapted to engage the contacts on said arm, a stud for engaging said arm, a shoulder on said stud, a cross-piece beneath said arm to limit its movement in one direction, said cross-piece having an aperture to permit the passage of said stud and to engage said shoulder to limit the movement of the arm in the opposite direction, and means responsive to temperature variations for actuating said stud.

6. A bellows, means responsive to temperature changes for varying the pressure in said bellows, a stud mounted on said bellows, a contact arm carrying a pair of contacts in line with said stud and insulated from one another, said arm being adapted to be moved by said stud, a bi-metallic strip carrying a pair of contacts for engaging the contacts on said arm, and a cross-piece for limiting the movement of said arm in both directions.

7. A bellows, means responsive to temperature changes for varying the pressure in said bellows, a stud mounted on said bellows, a contact arm carrying a pair of contacts in line with said stud and insulated from one another, said arm being adapted to be moved by said stud, a strip responsive to humidity variations carrying a pair of contacts for engaging the contacts on said arm, and a cross-piece for limiting the movement of said arm in both directions.

8. A base plate, a bracket mounted on said base plate, a pair of contact carrying arms mounted on said bracket, a pair of contacts carried by said arms and insulated from one another, a bi-metallic strip mounted on said bracket, a pair of contacts on said strip between said first mentioned contacts, a bellows, a stud mounted on said bellows for moving said contact arms in response to pressure in said bellows, a shoulder on said stud, an apertured cross-piece mounted on said base through which said stud may pass, said cross-piece engaging said contact arms to limit their movement in one direction and engaging said shoulder to limit the effect of said bellows in moving the contact arms in the opposite direction, temperature responsive means for controlling the pressure in said bellows, means for adjusting said bracket to set the contact arms and bi-metallic strip at a desired position, means for adjusting the effective length of said bi-metallic strip, means for adjusting the position at which said cross-piece engages the shoulder of said stud, independent means for adjusting the position at which said cross-piece engages said contact carrying arms, and means for adjusting the space between the contacts on said arms.

9. A base plate, a bracket mounted on said plate, a pair of contact carrying arms mounted on said bracket, a pair of contacts carried by said arms and insulated from one another, a strip responsive to humidity variations mounted on said bracket, a pair of contacts on said strip between said first mentioned contacts, a bellows, a stud mounted on said bellows for moving said contact arms in response to pressure in said bellows, a shoulder on said stud, an apertured cross-piece mounted on said base through which said stud may pass, said cross-piece engaging said contact arms to limit their movement in one direction and engaging said shoulder to limit the effect of said bellows in moving the contact arms in the opposite direction, temperature responsive means for controlling the pressure in said bellows, means for adjusting said bracket to set the contact arms and strip at a desired position, means for adjusting the effective length of said strip, means for adjusting the position at which said cross-piece engages the shoulder of said stud, independent means for adjusting the position at which said cross-piece engages said contact carrying arms, and means for adjusting the space between the contacts on said arms.

RUDOLF BECK.